US012012771B2

(12) United States Patent
Capet et al.

(10) Patent No.: US 12,012,771 B2
(45) Date of Patent: Jun. 18, 2024

(54) FOLDABLE/DEPLOYABLE STRUCTURE COMPRISING A DEPLOYABLE MAST

(71) Applicants: ANYWAVES, Toulouse (FR); CLIX INDUSTRIES, Montrabé (FR)

(72) Inventors: Nicolas Capet, Toulouse (FR); Richard Boudinot, Pibrac (FR)

(73) Assignees: ANYWAVES, Toulouse (FR); CLIX INDUSTRIES, Montrabé (FR)

( * ) Notice: Subject to any disclaimer, the term of this patent is extended or adjusted under 35 U.S.C. 154(b) by 164 days.

(21) Appl. No.: 17/626,466

(22) PCT Filed: Jul. 10, 2020

(86) PCT No.: PCT/EP2020/069645
§ 371 (c)(1),
(2) Date: Jan. 11, 2022

(87) PCT Pub. No.: WO2021/009072
PCT Pub. Date: Jan. 21, 2021

(65) Prior Publication Data

US 2022/0290459 A1 Sep. 15, 2022

(30) Foreign Application Priority Data

Jul. 12, 2019 (FR) ...................................... 19 07867

(51) Int. Cl.
*H01Q 1/12* (2006.01)
*E04H 12/02* (2006.01)
(Continued)

(52) U.S. Cl.
CPC ............. *E04H 12/20* (2013.01); *E04H 12/02* (2013.01); *H01Q 1/1235* (2013.01); *H01Q 1/20* (2013.01)

(58) Field of Classification Search
CPC ........ H01Q 1/12; H01Q 1/08; H01Q 1/14–20; E04H 12/02; E04H 12/20–22
See application file for complete search history.

(56) References Cited

U.S. PATENT DOCUMENTS 3,913,109 A 10/1975 Owen
2005/0224545 A1 10/2005 Boschma
(Continued)

OTHER PUBLICATIONS

International Search Report dated Oct. 2, 2020.

*Primary Examiner* — Hasan Islam
(74) *Attorney, Agent, or Firm* — IPSILON USA, LLP

(57) ABSTRACT

The invention relates to a foldable/deployable structure (1) comprising: —a mast (4) which can be deployed along a longitudinal deployment axis, the mast being designed to be placed either in a folded state requiring little axial installation space, or in a deployed state having a predetermined shape, —a base (10) upon which the deployable mast (4) is rested, the structure (1, 2) further comprising a bracing device, the bracing device: —having at least three points for attachment to the base (10) and at least three points for attachment to the mast (4), the bracing device connecting the base to the mast; —being designed to limit the transverse movements of the mast relative to the base (10) at least when the mast (4) is in a deployed state, and; —comprising at least one connecting member (22, 42, 60) chosen from the group formed by fabrics, non-woven fabrics and ties, the ties being chosen from the group formed by monofilaments, cables, bundles and strips; the structure (1, 2) being characterised in that it comprises a device (30) for tensioning each connecting member of the bracing device when the mast (4) is in the deployed state, the tensioning device (30) enabling a proximal end of the mast (4) to be maintained in the deployed state, at a distance from the base (10) greater than the
(Continued)

distance separating the proximal end of the mast (4) from the base (10) when the mast is in the folded state.

12 Claims, 9 Drawing Sheets

(51) Int. Cl.
*E04H 12/20* (2006.01)
*H01Q 1/20* (2006.01)

(56) References Cited

U.S. PATENT DOCUMENTS

| | | | | |
|---|---|---|---|---|
| 2011/0139956 | A1 | 6/2011 | Caswell | |
| 2013/0292526 | A1 * | 11/2013 | Murphy | H01Q 1/1235<br>248/157 |
| 2019/0292804 | A1 * | 9/2019 | Kensinger | B66C 23/78 |

* cited by examiner

FOLDABLE/DEPLOYABLE STRUCTURE COMPRISING A DEPLOYABLE MAST

RELATED APPLICATION

This application is a National Phase of PCT/EP2020/069645 filed on Jul. 10, 2020, which claims the benefit of priority from French Patent Application No. 19 07867, filed on Jul. 12, 2019, the entirety of which are incorporated by reference.

FIELD OF THE INVENTION

The invention relates to a foldable/deployable structure exhibiting spontaneous deployment and having a deployable pole.

DESCRIPTION OF RELATED ART

Such deployable structures comprising such a deployable pole can be used for numerous applications on land (temporary shelters, display panels, supports for sensors, detectors, transmitters, receivers, etc.) or in space (support for mechanical members such as a drag sail for a satellite, deployable solar panels; sensors such as a camera, a transmitter, a receiver, or a magnetometer, etc.).

In particular, such sensors or members of a spatial pole need to be carried by the distal end of the pole in order to space them apart from the main body of the spatial system and to make it possible to carry out measurements on this main body or not to be electromagnetically influenced thereby for example. Such a spatial pole sometimes has a length of up to several meters and needs to be able to be folded up during launching and to be deployed only when the spatial structure is in space, in its use position.

A deployable pole for spatial applications that is formed by an inflatable tube is already known from the document US 2004/0046085. Such a pole is very lightweight but does not exhibit satisfactory stability, positioning precision and rigidity. A support comprising an inflatable tube is also known from GB2456424.

The document WO2010/004168 proposes a deployable pole comprising a framework made up of a succession of stages that are articulated together in pairs in the continuation of one another along a deployment axis, the stages being articulated together by hinges. Such a pole, which can be locked in the deployed state, requires a complex framework comprising small plates that are articulated together.

OBJECTS AND SUMMARY

The invention aims to propose a deployable structure that exhibits excellent positioning precision during deployment.

The invention also aims to propose a deployable structure that exhibits improved stability and resistance to mechanical loads in the deployed state.

The invention also aims to provide a deployable structure which exhibits excellent resistance to mechanical loads, both under tension and under compression, along a longitudinal deployment axis of the structure once deployed, and under loads along axes that form a non-zero angle with this longitudinal deployment axis.

Lastly, the invention aims to provide a deployable structure that is simple and economical to manufacture and to employ.

More specifically, the subject of the invention is a foldable/deployable structure having:

- a pole that is deployable along a longitudinal deployment axis, and that is designed to be able to be placed either in a folded state in which it has a minimum axial space requirement or in a deployed state in which it has a predetermined shape,
- a base on which said deployable pole stands, said structure also comprising a bracing device, said bracing device:

- having at least three points for fixing to said base and at least three points for fixing to said pole, said bracing device connecting said base to said pole;
- being designed to be able to limit the transverse movements of the pole with respect to the base, at least in a deployed state of said pole; and
- comprising at least one connecting member chosen from the group made up of woven fabrics, nonwovens and ties, said ties being chosen from the group made up of monofilaments, cables, bundles and tapes;

said structure being characterized in that it comprises a device for tensioning each connecting member of said bracing device, designed to be able to tension each connecting member of said bracing device, in the deployed state of the pole.

The bracing device of a structure according to the invention therefore makes it possible to increase the positioning precision of the pole, in particular during the deployment thereof, but also to increase the resistance to mechanical loads of a pole in the deployed state and in particular to avoid the distortion thereof away from the longitudinal deployment axis.

Throughout the text, the term "longitudinal" and derived forms thereof refer, when the structure has a straight deployment line, to the straight longitudinal direction along which it is deployed. When the structure is more or less curved or has a more or less curved deployment line between its longitudinal ends, they refer, in any cross section of the structure, to a direction tangent to the deployment line. The term "transverse" and derived forms thereof, and the term "lateral" and derived forms thereof, refer to directions orthogonal to the longitudinal direction.

Throughout the text, the term "proximal" refers to the elements of the structure that are disposed next to the base and the term "distal" refers to the elements of the structure that are disposed at the opposite end of the pole from the end fixed to the base, i.e. to the elements that are farther away from the base than those disposed at said proximal end.

Various embodiments are possible as regards the pole. It may be a foldable/deployable pole exhibiting spontaneous deployment, meaning having such a structure that it tends to deploy spontaneously from a folded state. It may also be, for example, a pole such as a pole formed by an inflatable tube, the inflation of which is initiated by a dedicated device.

Various embodiments are possible as regards the bracing device. In particular, in certain embodiments in accordance with the invention, said connecting member is strong under tension—in particular under longitudinal tension. Each connecting member of the bracing device has at least one point for fixing to said base and at least one point for fixing to said pole, meaning a single point or a plurality of points that are juxtaposed and form lines for fixing or not. Thus, each connecting member chosen from the group formed of woven fabrics, nonwovens and tapes (or strips) may have a line for fixing to said base and/or at least one point for fixing to said pole. Alternatively or in combination, each connecting member chosen from the group formed of woven fabrics, nonwovens and tapes (or strips) may also have one or more separate fixing points (which are not mutually adjacent, i.e. do not form a fixing line).

In certain embodiments in accordance with the invention, said bracing device comprises at least two ties, at least one of said ties being a tape having at least two points for fixing to said base and at least two points for fixing to said pole.

In certain embodiments in accordance with the invention, said bracing device comprises at least three ties, each tie having at least one point for fixing to said base and at least one point for fixing to said pole. In other words, each tie connects at least one point of said base to at least one point of said pole. In certain embodiments in accordance with the invention, said bracing device comprises at least four ties, each tie connecting at least one point of said base to at least one point of said pole. The bracing device may also comprise more than four ties, for example five ties, six ties, seven ties, eight ties, or ten or twelve ties.

Said bracing device may therefore be in the form of a plurality of ties that connect at least one point of said base to at least one point of said pole, or in the form of a woven fabric extending at least partially around said pole in the deployed state. It may be for example a woven fabric in the form of a sail or of a sock extending around said pole in the deployed state. Such a sock preferably has at least two points for attaching to said base, in particular at least one attachment line, said sock connecting said pole to said base along such an attachment line. In certain embodiments in accordance with the invention, said bracing device comprises a connecting member chosen from the group made up of woven fabrics and nonwovens, said connecting member extending entirely around said pole in the deployed state.

In particular, in certain embodiments, it should be noted that each connecting member of said bracing device does not extend in contact with said pole in the deployed state (apart from each point of said pole that is connected to a point of said base by a tie). Thus, in the case of a bracing device in the form of a sock made of woven fabric, the sock extends around said pole in the deployed state so as to have a transverse cross section that is not coincident with the transverse cross section of said pole in one and the same plane. This has the effect of limiting the transverse movements of the pole with respect to the base even more effectively at least in a deployed state of said pole.

In particular, in certain embodiments in accordance with the invention, each connecting member is formed of at least one material chosen from the group made up of flexible polymeric materials, flexible composite materials, woven fabrics made of synthetic fibers (carbon fibers, glass fibers, aramid (aromatic polyamide) fibers, boron fibers, etc.), filaments made of synthetic fibers (polyamide fibers, polyester fibers, polyethylene fibers, chlorofibers, acrylic fibers, polypropylene fibers, polyurethane fibers, etc.), metal fibers, beryllium fibers, ceramic fibers, cellulosic fibers and mixtures thereof.

In certain embodiments in accordance with the invention, said structure comprises a device for controlling the initiation of the deployment associated with said pole so as to be able to allow the longitudinal deployment thereof into the deployed state from the folded state.

Various embodiments are possible as regards the disposition of the points for fixing said bracing device to said pole. The points for fixing said bracing device to said pole are preferably disposed above the halfway point of the height of said pole in the deployed state, in particular above two-thirds of the height of said pole in the deployed state, i.e. disposed on a distal portion of said pole. In certain embodiments in accordance with the invention, each connecting member connects said base to a distal portion of said pole in the deployed state. In particular, in certain embodiments in accordance with the invention, each connecting member connects said base to a distal end of said pole in the deployed state.

In certain embodiments in accordance with the invention, said structure comprises a device for tensioning said bracing device, in particular for tensioning each connecting member of said bracing device, designed to be able to tension each connecting member of said bracing device, in the deployed state of the pole. The tensioning device is a device separate from the pole itself and separate from the bracing device. It is chosen to be able to tension or increase the tension in the connecting members, when the deployable pole is in the deployed state—in particular only when the deployable pole is in the deployed state. The tensioning device allows, for example, when the pole is in the deployed state, a relative separating movement between at least one—in particular each—point for fixing said bracing device to said pole and the base. It thus allows precise positioning of the deployable pole, in the deployed state. In certain embodiments in accordance with the invention, the tensioning device is chosen to make it possible to keep a proximal end of the pole in the deployed state at a distance from said base greater than the distance between the proximal end of said pole and said base when said pole is in the folded state. Various embodiments are possible as regards the device for tensioning said bracing device. Such a tensioning device may for example comprise a cylinder and/or an actuator for moving the pole (that is to say the proximal end of the pole disposed next to the base of the structure) away from the base. In particular, in certain embodiments in accordance with the invention, said device for tensioning said bracing device has a helical spring designed to be able to be compressed in the folded state of said pole and extended in the deployed state of said pole so as to keep (when the pole is in the deployed state) a proximal end of said pole at a distance from said base greater than the distance separating said pole—in particular said proximal end of said pole—from said base when the pole is in the folded state.

In certain embodiments in accordance with the invention, the base comprises flaps, in particular at least three flaps, designed to be able to pivot between at least one closed position, in which said flaps form a receptable that is able to at least partially receive said pole in the folded state, and at least one open position, in which the flaps have been pivoted away from said pole, each connecting member connecting at least one point of a flap to at least one point of said pole.

In certain embodiments in accordance with the invention, in the deployed position, each connecting member extends in at least one direction forming a non-zero angle with respect to the longitudinal deployment axis of said pole.

In certain embodiments in accordance with the invention, said structure comprises an antenna (i.e. a data communications antenna). On board the satellites there is an antenna for transmitting and/or receiving said data by radiation of an electromagnetic beam, and means for orienting this electromagnetic beam toward a target, which may be a station on the ground or another satellite.

Various embodiments are possible as regards the disposition of the antenna on the structure. The antenna may for example be disposed at the distal end of the pole or on the base. In certain embodiments in accordance with the invention, in the deployed position, said antenna is helical and extends in a longitudinal direction substantially parallel to said longitudinal deployment axis, said pole extending longitudinally inside said antenna. It is also possible to provide for the antenna to be disposed inside the pole.

In certain embodiments in accordance with the invention, said bracing device, in particular each connecting device, has at least one point for fixing to said antenna. This makes it possible in particular to coordinate the deployment of the pole and the deployment of the antenna when the antenna is a foldable/deployable antenna.

In certain embodiments in accordance with the invention, the antenna comprises a radiating source, designed to radiate electromagnetic waves and a main reflector, of the antenna, the antenna being designed such that the main reflector can radiate said electromagnetic beam from the electromagnetic waves radiated by the radiating source. Such a main reflector may for example have at least substantially a hyperbolic paraboloid shape.

In certain embodiments in accordance with the invention, said pole adopts, in the deployed state, a rigid stable form under axial compression. In certain embodiments in accordance with the invention, the structure is locked in the deployed state.

The connecting members of the bracing device are distributed and fixed between the pole and the base of a structure according to the invention so as to be designed to limit the transverse movements of the pole with respect to the base in the deployed state. In particular, in certain embodiments in accordance with the invention, the bracing device is designed to be able to keep said pole isostatic with respect to said base. In particular, in certain embodiments in accordance with the invention, when the bracing device has at least four points for fixing to the base and at least four points for fixing to the pole, the bracing device is designed to be able to keep said pole hyperstatic with respect to said base.

The invention also extends to a method for deploying such a structure.

The invention also relates to a structure and a method that are characterized, in combination or not, by all or some of the features mentioned above or below. Irrespective of the formal presentation given thereof, unless explicitly mentioned otherwise, the various features mentioned above or below should not be considered to be intrinsically or inextricably linked to one another, the invention being able to relate to only one of the structural or functional features, or only a part of these structural or functional features, or only a part of one of these structural of functional features, or any grouping, combination or juxtaposition of all or part of these structural or functional features.

BRIEF DESCRIPTION OF DRAWINGS

Further aims, features and advantages of the invention will become apparent from the following nonlimiting description of some of the possible embodiments thereof, with reference to the appended figures, in which.

DETAILED DESCRIPTION

Figure 1:
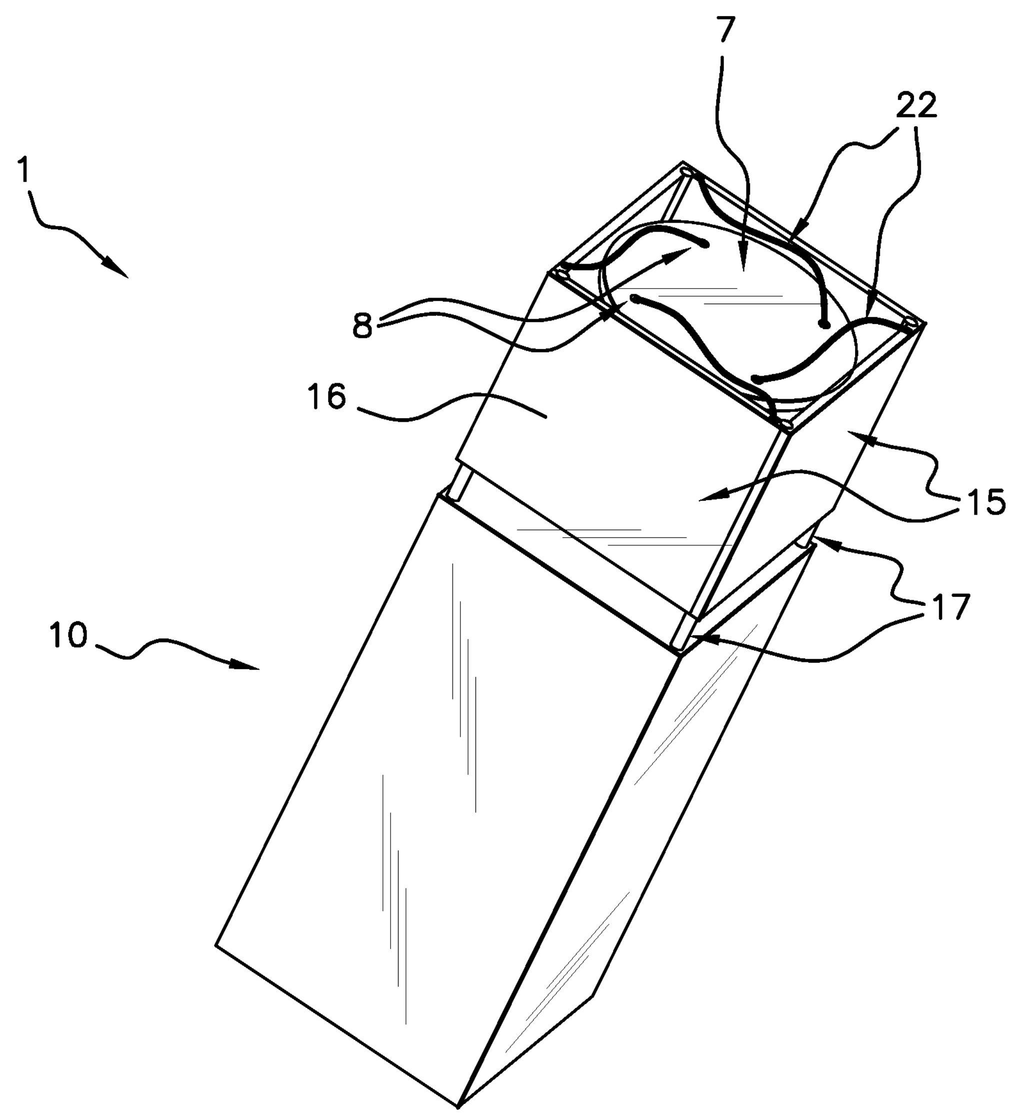
FIG. 1 is a perspective view of a structure according to a first embodiment of the invention in the folded state.
Figure 2:
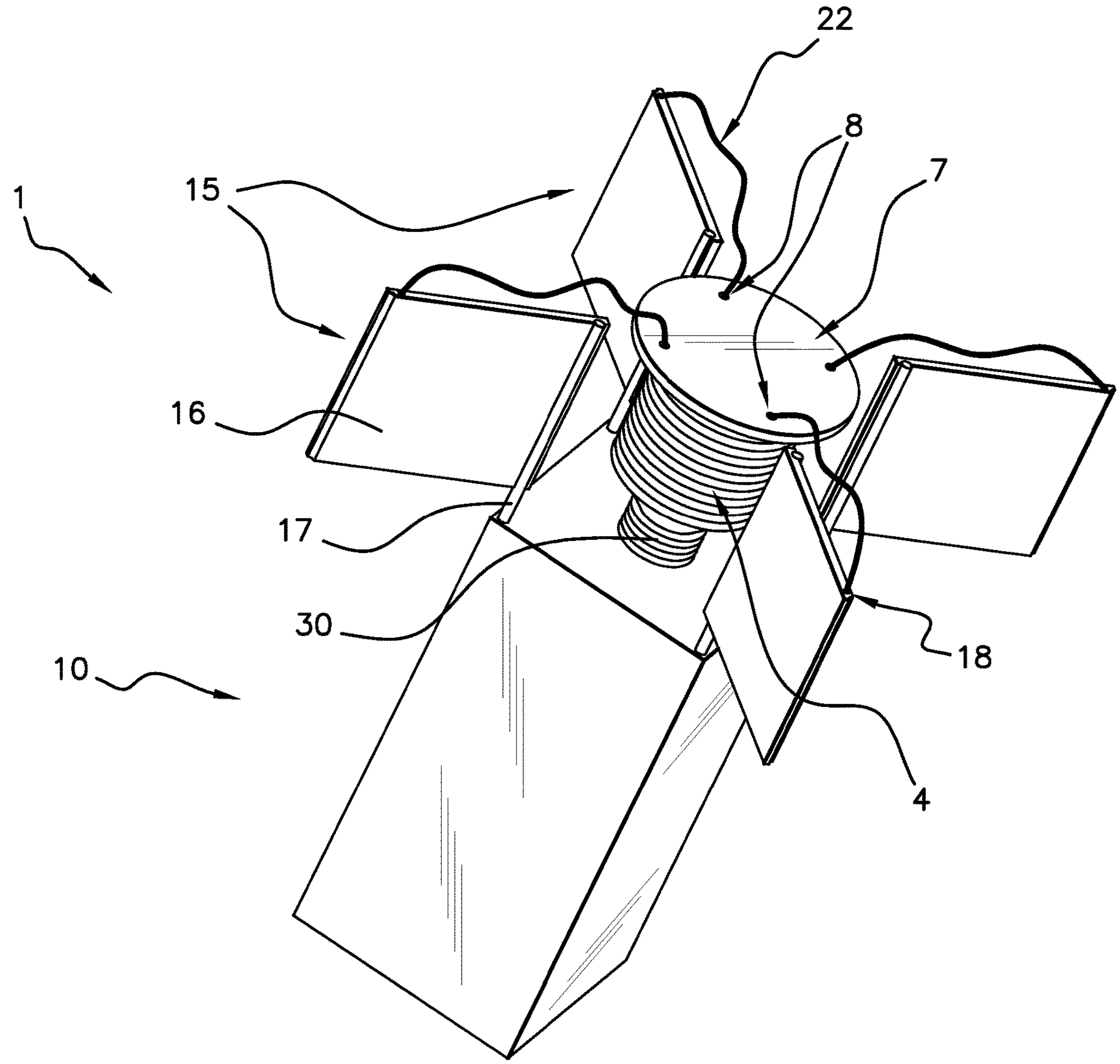
FIG. 2 is a perspective view of a structure according to the first embodiment of the invention.

According to a first embodiment of the invention, a foldable/deployable structure 1 shown in FIGS. 1 to 4 has a pole 4 that is deployable along a longitudinal deployment axis that also defines a longitudinal direction of the structure.

In particular, the pole 4 exhibits spontaneous deployment. It may for example be an inflatable pole or a pole made entirely of one piece of a single material (for example a polymer material or composite material having a polymer matrix, or a metal material) and designed to be able to be folded locally in any zone of this pole so as to form a folding hinge exhibiting spontaneous deployment. It may also be a deployable pole comprising a framework formed of a succession of stages articulated together as described in WO2010/004168.

The deployable pole 4 is designed to be able to be placed either in a folded state, in which it has a minimum axial space requirement, or in a deployed state, in which it has a predetermined shape. In particular, the pole 4 adopts, in the deployed state, a rigid stable form under axial compression.

The deployable pole extends between two longitudinal ends. In particular, in the deployed state, the pole 4 has one and the same transverse cross section between its two longitudinal ends. In particular, the pole 4 has a substantially cylindrical overall shape in the deployed state. However, the pole 4 may also have a more complex non-profiled shape, for example a succession of frustoconical or wavy portions.

In the embodiments shown in FIGS. 1 to 9, the pole 4 has a conical proximal end 9. In the embodiments shown in FIGS. 1 to 9, the pole 4 has, at its distal end, a plate 7 in the form of a disk.

The deployable pole 4 stands on a base 10 of the structure 1. In the embodiments shown in FIGS. 1 to 9, the base 10 has a parallelepipedal shape, the proximal end of the pole 4 standing on one of the main faces of said parallelepiped. The base 10 may be formed of any member or system provided with a deployable pole. It may in particular be a satellite and in particular a miniaturized satellite (for example a nanosatellite).

The pole 4 is connected to the base 10 (directly or indirectly) by any type of connection, which may in particular be a ball joint-type connection, such a connection making it possible in particular to limit the stresses exerted on the deployed pole.

The foldable/deployable structure 1 comprises a bracing device comprising four ties 22, each tie 22 connecting at least one point of said base 10 to at least one point of said pole 4. The bracing device comprises at least two ties (i.e. a number of ties greater than or equal to two). The bracing device may therefore comprise for example five ties or up to ten, twenty or thirty ties 22. The ties 22 are distributed around the pole 4 in a manner spaced apart regularly or irregularly from one another, depending on the applications and the mechanical loads to which the structure is likely to be subjected. It could for example be advantageous to enhance the resistance to transverse loads of one side of the structure. The bracing device is therefore not necessarily symmetric.

Each tie 22 may for example be formed of at least one filament, cable, tape or strip made of at least one material chosen from the group made up of flexible polymer materials, flexible composite materials, woven fabrics made of synthetic fibers (carbon fibers, glass fibers, aramid (aromatic polyamide) fibers, boron fibers, etc.), filaments made of synthetic fibers (polyamide fibers, polyester fibers, polyethylene fibers, chlorofibers, acrylic fibers, polypropylene fibers, polyurethane fibers, etc.), metal fibers, beryllium fibers, ceramic fibers, cellulosic fibers and mixtures thereof. In particular, each tie is formed of at least one filament, cable or tape that is flexible and strong under tension.

Each tie 22 may for example be formed of aramid fibers. Such fibers are flexible and strong under tension.

Each tie 22 may be fixed to the base and to the pole with the aid of a loop, by passing it into an opening formed in the base or in the pole, or by adhesive bonding with the aid of a synthetic resin. In the first embodiment shown in FIGS. 1 to 4, each tie 22 is fixed on one side to an edge of the plate 7 at the distal end of the pole 4 by passing into an opening 8, the plate having four openings 8, and on the other side to a point 18 on one edge of each flap 15.

The foldable/deployable structure 1 also comprises a device 30 for tensioning the bracing device. Such a tensioning device is for example designed to make it possible to push the proximal end of the pole 4 away from the base, for example with the aid of a cylinder and/or actuator. It could also be winders designed to tension each tie 22 once the pole has been deployed. The device for tensioning the bracing device may also make it possible to adjust the length of each tie, in particular during the deployment of the pole when each tie 22 is deployed simultaneously with the pole 4. The foldable/deployable structure 1 may also comprise such a device for adjusting the length of each tie 22 that is separate from the device for tensioning the bracing device. In the first embodiment of a structure 1 according to the invention, the device 30 for tensioning the bracing device has a helical spring designed to be able to be compressed in the folded state of the pole 4 and extended (by expansion of said spring) in the deployed state of the pole 4 so as to keep the proximal end of the pole at a distance from the base 10 greater than the distance between the pole and the base 10 when the pole 4 is in the folded state. The structure 1 could also comprise for example a device for adjusting the length of each tie 22 provided at each point for fixing a tie 22 to the plate 7 and/or at the point 18 of each flap 15; such a device for adjusting the length of each tie could be for example of the endless-screw device type. In particular, such an adjusting device is not necessary when the bracing device of the structure has three or more ties.

The foldable/deployable structure 1 may also comprise a device for controlling the initiation of the deployment associated with said pole so as to be able to allow the longitudinal deployment thereof into the deployed state from the folded state.

In the first embodiment of a structure 1 shown in FIGS. 1 to 4, the base 10 comprises four pivoting flaps 15. In the closed position, the flaps 15 form a receptacle that is able to receive the pole 4 in the folded position (FIG. 1). In the open position, the flaps 15 have been pivoted toward the outside of the structure so as to move away from the pole 4 (FIG. 2), each tie 22 connecting each flap 15 to the plate 7 at the distal end of the pole 4. Each flap 15 comprises a panel 16, the main faces of which are substantially square or rectangular. A pivoting stem 17 connects each flap 15 to the base 10.

The device for controlling the initiation of the deployment associated with said pole may be coupled to a device for holding the pole in the folded state.

Various embodiments may be envisioned as regards the device for holding the pole in the folded state. According to other embodiments that are not shown, it is possible to use at least one filament or cable made of thermoplastic polymer to hold the structure in the folded state.

The device for holding the pole in the folded position may in particular be in the form of a filament, a bundle of filaments, a tape, a unidirectional clamping collar, a sleeve (woven or nonwoven), etc. In certain embodiments in accordance with the invention, said holding device comprises at least one filament made of thermoplastic polymer material which is designed to be able to be ruptured by melting. This may be a single filament or a bundle of filaments, optionally woven together. A deployable structure according to the invention may for example comprise a microcontroller for controlling the rupture of said holding device at least one point so as to allow the deployment of said pole.

In certain embodiments in accordance with the invention, the material forming said holding device is chosen from the group made up of polymer materials having a melting point lower than 300° C., in particular a melting point between 0° C. and 280° C., in particular from the group made up of polypropylenes (PP), polyethylenes (PE) (for example Dyneema® sold by DSM® (Heerlen, Netherlands) ("UHMWPE" or ultra-high-molecular-weight polyethylene)), polyaramids (for example Kevlar® sold by DuPont® (Midland, USA)), polyamides, polyesters, composites thereof and mixtures thereof.

In certain embodiments in accordance with the invention, the device for holding the pole in the folded state comprises at least one heating device designed to be able to rupture said holding device by melting. It may be for example a heating device (sometimes known as a "heating knife") formed of a filament (for example a metal filament such as a filament made of an alloy of nickel and chromium) or a metal plate designed to be able to reach a predetermined temperature at least equal to the melting point of the material forming said holding device to be ruptured. The heating device comprises in particular an electrically conductive material designed to be able to heat up by the Joule effect ($P=RI^2$ under direct current, P representing an electric power, R the electric resistance of the heating device and I the electric current) when it is electrically connected to two terminals of a generator.

The device for controlling the initiation of the deployment associated with the pole 4 may therefore be a device for deactivating the device for holding the pole in the folded state. It may be a heating device in the case of holding with the aid of a meltable filament or a bundle of meltable filaments, or flaps 15 in the first embodiment of a structure according to the invention, the closed flaps 15 being able for example to exert compression on the pole in the folded state such that when the opening of the flaps 15 by pivoting is initiated, the pole 4 is released and its deployment thus initiated. It is also possible to combine the two in one and the same foldable/deployable structure (holding with the aid of meltable filaments and holding in the folded state by the flaps 15).

Moreover, the tensioning device 30 of this kind may be such that the structure can be deployed in a single step or in at least two expansion steps. If the tensioning device is actuated or activated spontaneously or concomitantly with the device for controlling the deployment associated with the pole, it is possible to refer to expansion in a single step, the tensioning of the ties of the bracing device being realized during the deployment of the pole and in particular at the end of deployment of the pole. The pole thus deployed is very rapidly stable and able to withstand transverse mechanical loads.

In a second variant, it is possible to initiate the tensioning of the ties of the bracing device by the tensioning device in a manner separate from the device for controlling the initiation of the deployment associated with the pole, the deployment of the structure then being able to be realized in at least two steps (deployment of the pole 4 and then tensioning of the bracing device). To this end, it is possible for example to provide a meltable filament holding the helical spring in the compressed position, associated with a heating device designed to be able to rupture this meltable filament at the desired time.

Thus, for example if the tensioning device 30 is helical spring which is compressed in the folded state of the structure and the expansion of which is allowed simultaneously with the initiation of the deployment of the pole 4, the deployment of the structure will take place in one step (although this deployment may take place gradually, however, up to the effective tensioning of the ties of the bracing device, typically in a few seconds).

Figure 3:
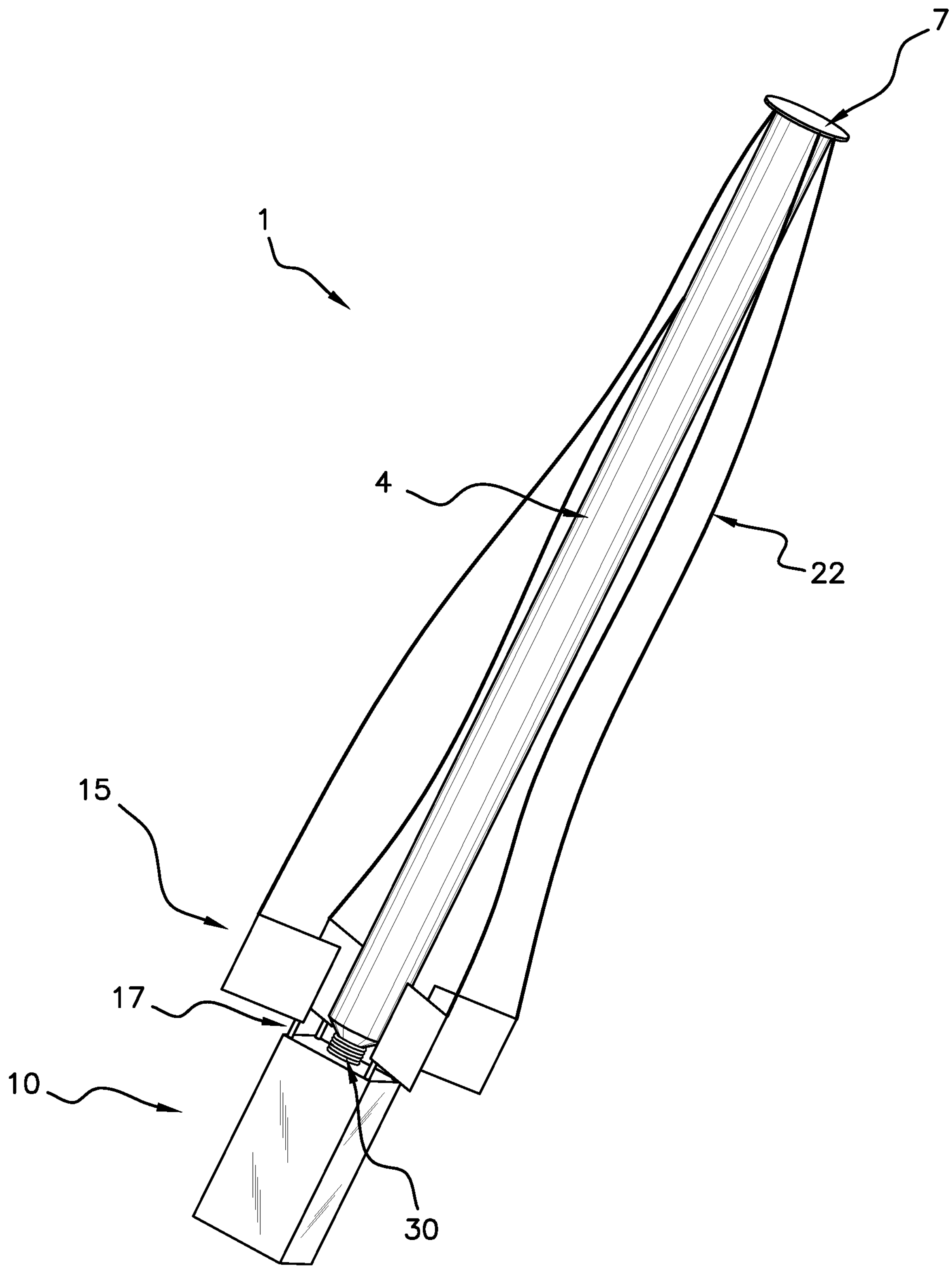
FIG. 3 is a perspective view of a structure according to the first embodiment of the invention in the deployed state.
Figure 4:
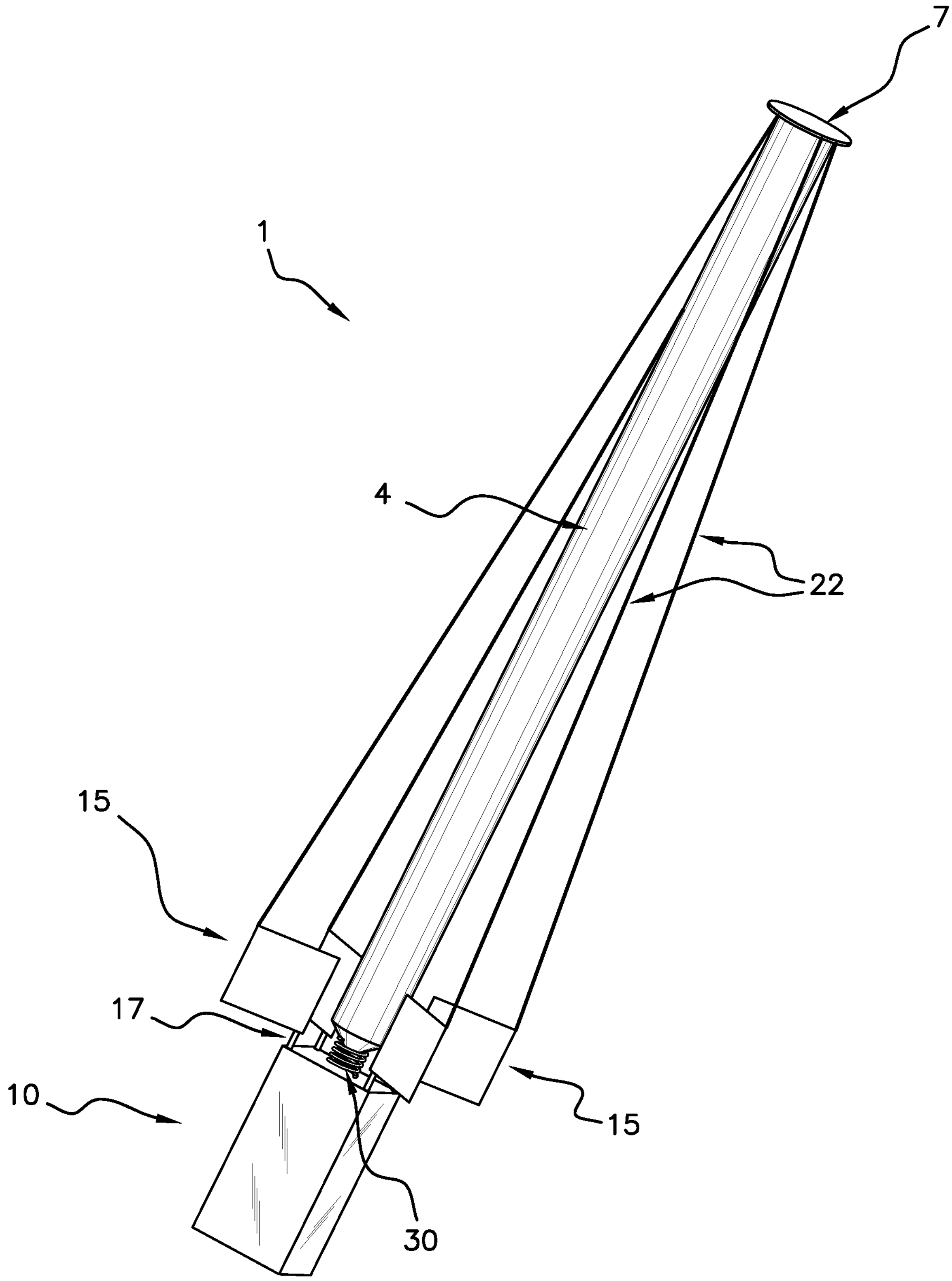
FIG. 4 is a perspective view of a structure according to the first embodiment of the invention in the deployed state.

FIG. 3 shows the structure 1 after initiation of the deployment of the pole 4 and at the end of deployment of said pole, the pole having reached its predetermined maximum length corresponding to its deployed state. FIG. 4 shows the structure 1 after deployment of said pole and tensioning of the ties 22 of the bracing device, the helical spring 30 being more extended than the helical spring 30 visible in FIG. 3. After tensioning of the bracing device, the ties 22 which are not tensioned in FIG. 3 become tensioned in FIG. 4 so as to obtain a structure 1, the position of which in the deployed state of the pole 4 is precise and stable. Thus, after deployment of the pole 4 and tensioning of the ties 22 of the bracing device, the pole 4 is kept isostatic or hyperstatic with respect to said base 10. Moreover, the tensioning device 30 makes it possible to lock the structure 1 in the deployed state.

In the embodiment shown in FIGS. 5 to 8, the foldable/deployable structure 2 differs from a structure 1 according to the first embodiment shown in FIGS. 1 to 4 in that the ties 42 are fixed directly to the base 10 and not via flaps 15.

The foldable/deployable structure 2 shown in FIGS. 5 to 8 has a deployable pole 4 that is identical to the pole according to the first embodiment of a structure according to the invention and stands on one and the same base 10.

The foldable/deployable structure 2 shown in FIGS. 5 to 8 comprises a bracing device comprising four ties 42, each tie 42 connecting at least one corner 45 of the base 10 to at least one point of the plate 7 at the distal end of the pole 4.

Figure 5:
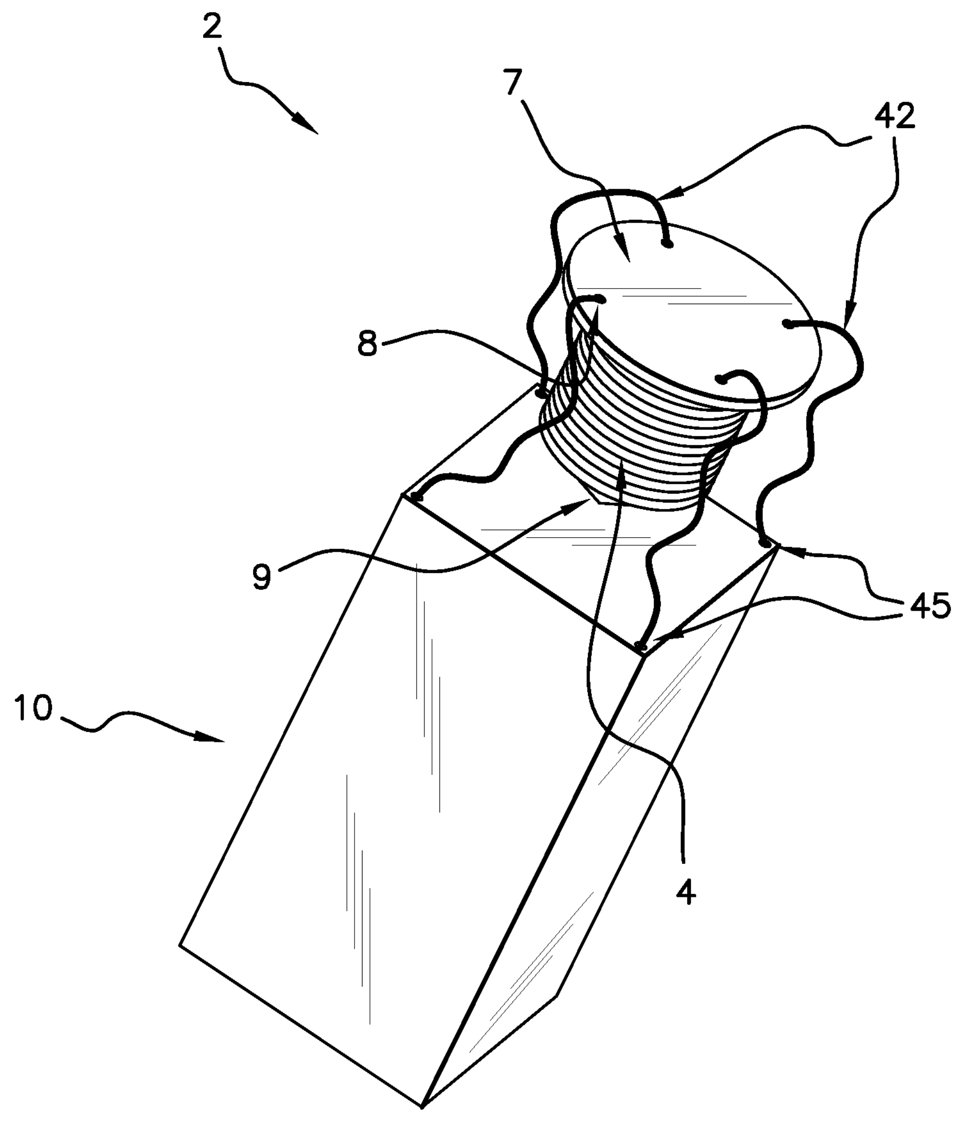
FIG. 5 is a perspective view of a structure according to a second embodiment of the invention in the folded state.

FIG. 5 shows the structure 2 in the folded state (before initiation of the deployment of the pole). In FIG. 5, the helical spring of the device 30 for tensioning the bracing device is compressed.

Figure 6:
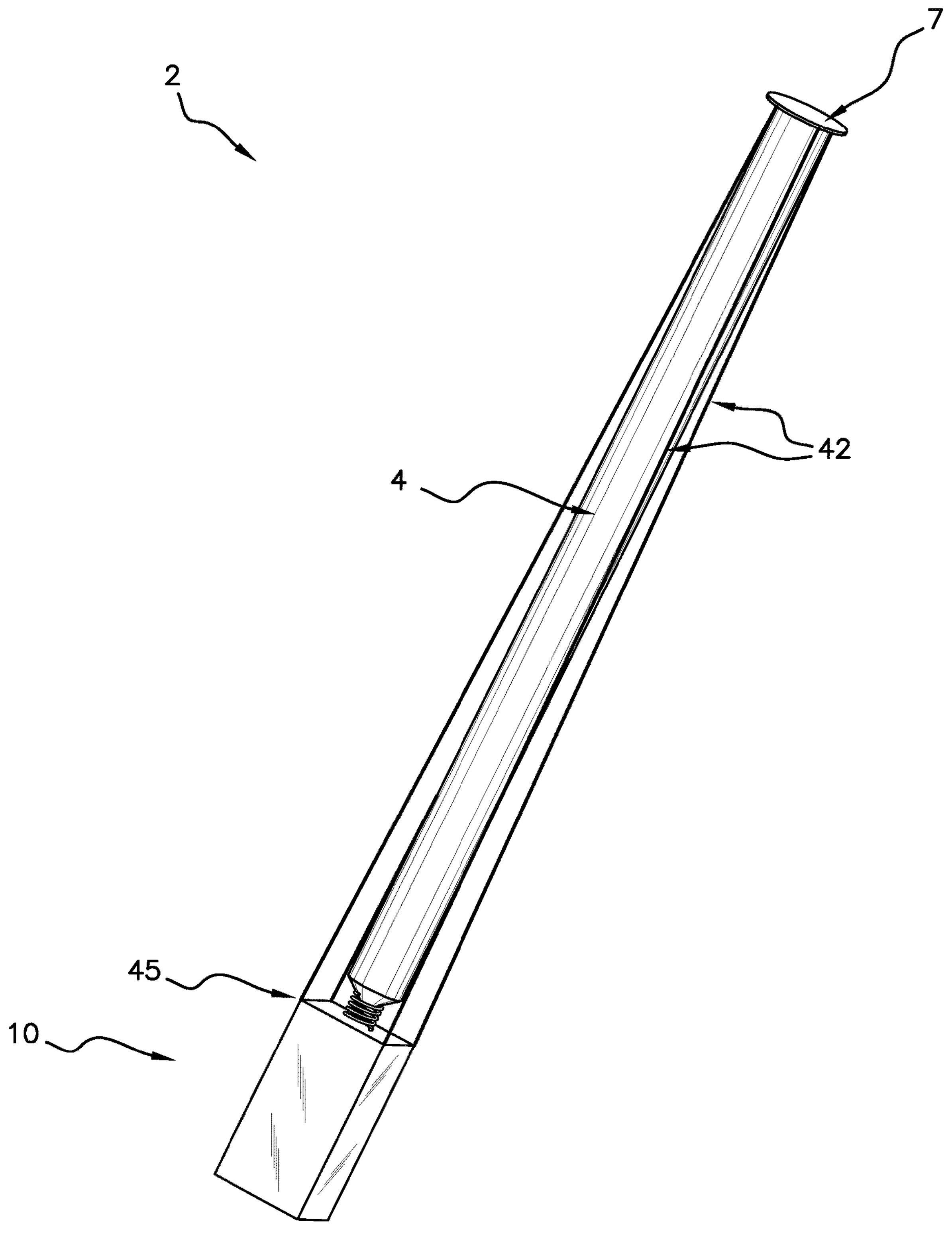
FIG. 6 is a perspective view of a structure according to the second embodiment of the invention in the deployed state.

FIG. 6 shows the structure 2 in the deployed state and after tensioning of the ties 42 of the bracing device by expansion of the helical spring of the device 30 for tensioning the bracing device (as in FIG. 4 as regards the structure 1 according to the first embodiment).

Figure 8:
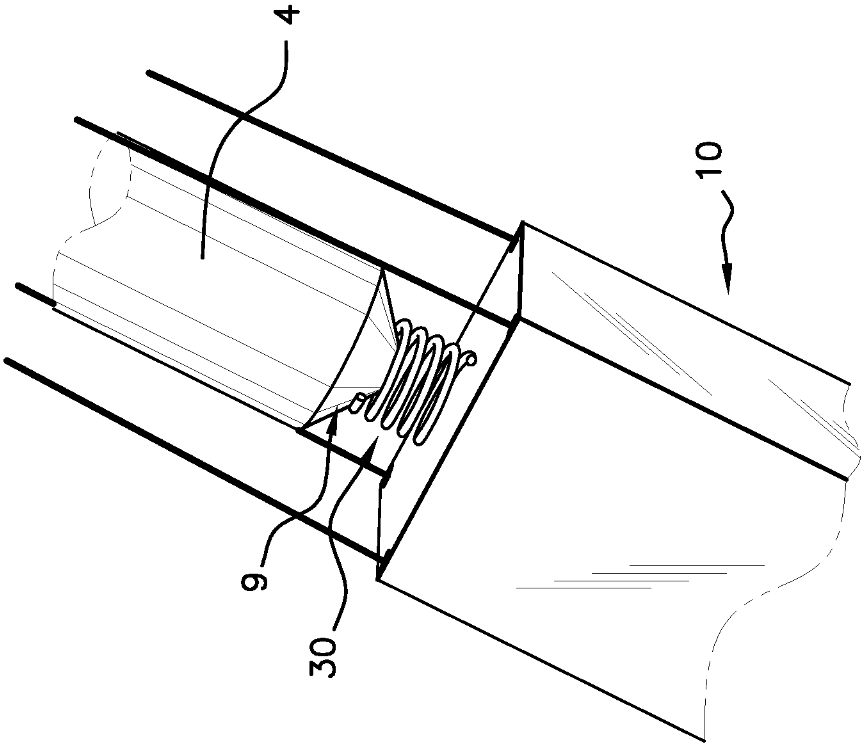
FIG. 8 is a perspective view of a detail of a structure according to the second embodiment of the invention in the deployed state.
Figure 7:
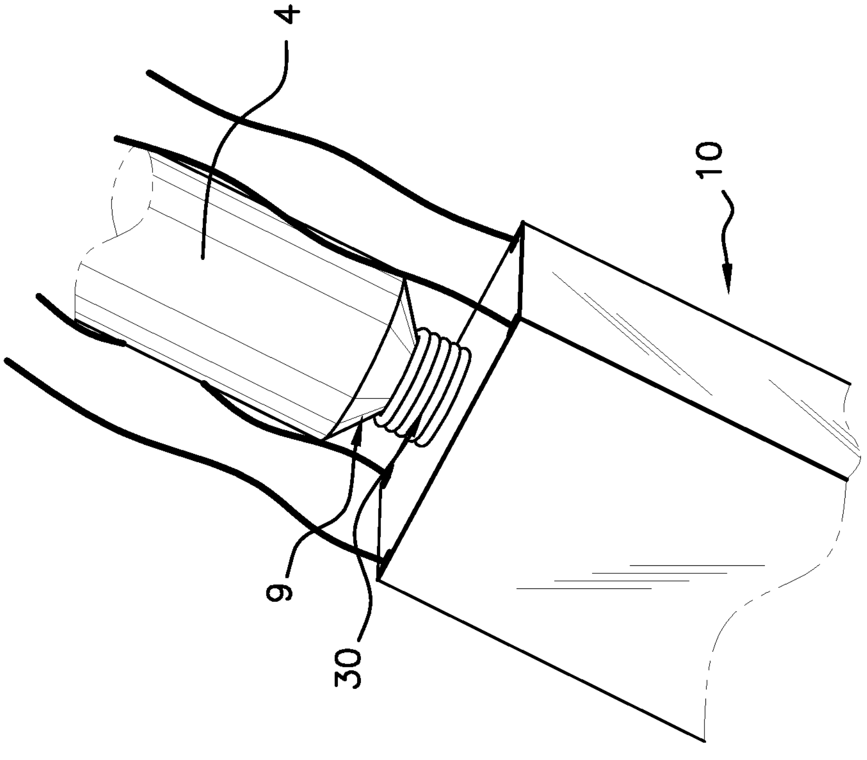
FIG. 7 is a perspective view of a detail of a structure according to the second embodiment of the invention in the deployed state.

FIG. 7 shows a detail of a structure 2, the pole of which is in the deployed state, before tensioning of the ties 42 of the bracing device (the helical spring being compressed). FIG. 8 shows a detail of a structure 2, the pole of which is in the deployed state, after tensioning of the ties 42 of the bracing device in accordance with the depiction in FIG. 6, the helical spring being extended.

Figure 9:
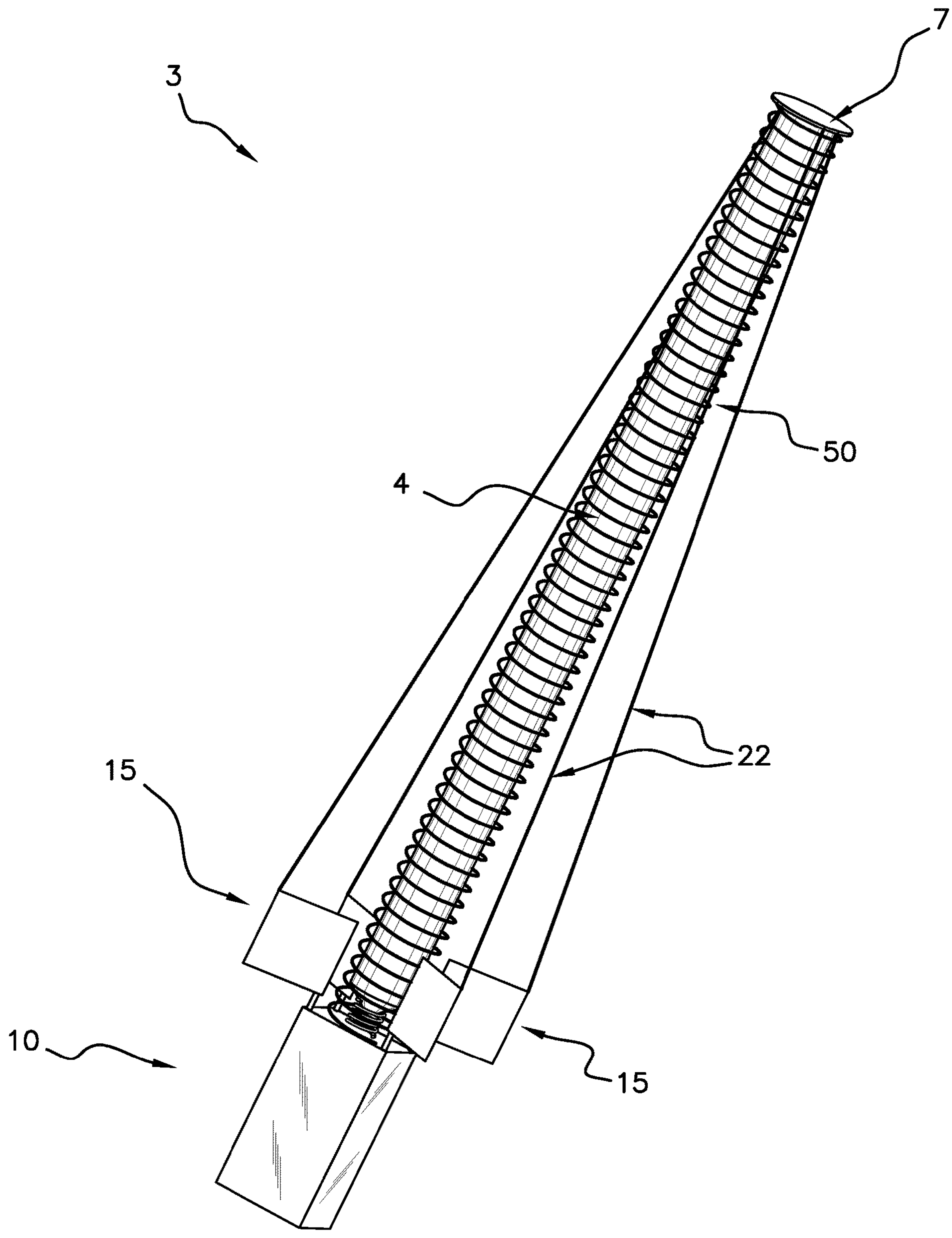
FIG. 9 is a perspective view of a structure according to a third embodiment of the invention in the deployed state.

In a third embodiment of the invention shown in the deployed state in FIG. 9, a foldable/deployable structure 3 differs from a structure 1 according to the first embodiment in that it also comprises an antenna 50.

Various configurations are possible as regards the type of antenna and its disposition in the structure. The antenna may be fixed to the base, to the end of the pole, or around or inside the pole 4. The antenna 50 shown in FIG. 9 is helical and extends in a longitudinal direction substantially parallel to the longitudinal deployment axis of the structure 3, the pole 4 extending longitudinally inside the antenna 50. The antenna 50 is fixed to each longitudinal end of the pole 4 and can be compressed in the manner of a spring, such that in the folded state, the structure 3 has the same axial space requirement as the structures 1 or 2 according to the first embodiment and the second embodiment.

In a variant (not shown), it is also possible to provide for the bracing device, in this case the ties 22, to be connected at one or more points to the antenna by fixing points, for example with the aid of a synthetic resin in the form of spots of adhesive or with the aid of secondary ties or other types of attachment or additional loops.

Figure 10:
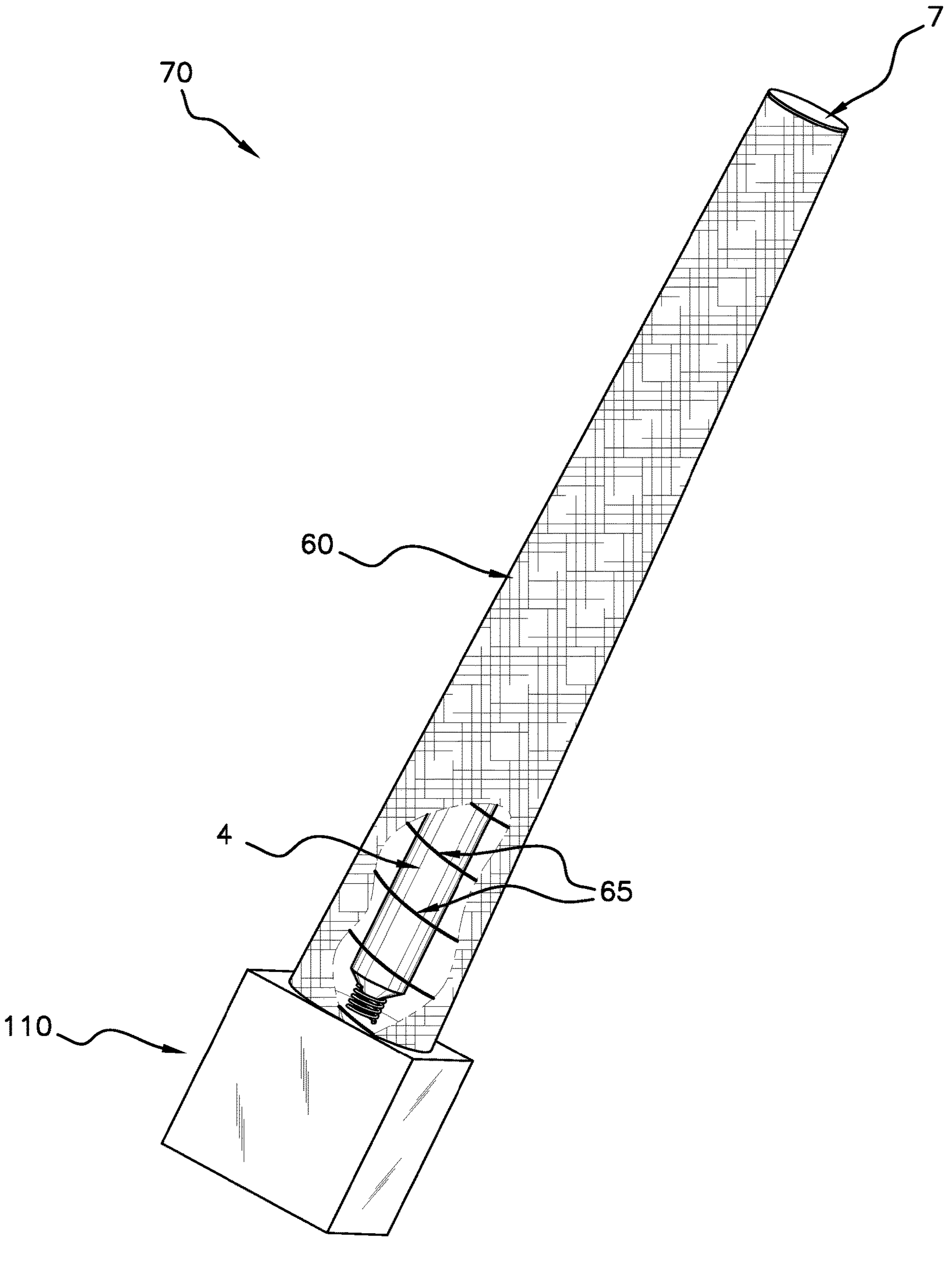
FIG. 10 is a perspective view of a structure according to a fourth embodiment of the invention in the deployed state.

According to a fourth embodiment of a structure 70 according to the invention shown in FIG. 10, a foldable/deployable structure 70 differs from a structure 1 according to the first embodiment in that the bracing device is formed of a connecting member chosen from the group made up of woven fabrics and nonwovens, the woven fabric (or nonwoven) extending entirely around said pole 4 in the deployed state in the manner of a sock 60. The sock 60 is fixed along a circular fixing line to the base 110 and also along a circular fixing line to the plate 7 at the distal end of the pole 4, the pole 4 being disposed inside the sock 60. The sock may also incorporate a helical antenna 65, the antenna being disposed around (on the outside of) the pole 4 in the deployed state of the structure.

In the folded state (FIGS. 1, 2 and 5) (before deployment), the pole 4 may be for example in the overall shape of a cylinder, the external dimensions of which are around 100 mm in height with a diameter of around 9 mm.

In the deployed state (FIGS. 4, 6 and 9), the pole 4 may for example have external dimensions such that the pole has a length of around 60 mm, or even possibly up to a meter in length.

There may be numerous variants and applications of the invention other than those described above. In particular, it goes without saying that, unless indicated otherwise, the different structural and functional features of each of the embodiments described above should not be considered as being combined and/or intrinsically and/or inextricably linked with one another, but, by contrast, as being simple juxtapositions. Moreover, the structural and/or functional features of the different embodiments described above may be subject in full or in part to any other juxtaposition or any other combination. For example, it may be possible for the structure not to have a base.

The invention claimed is:

1. A foldable/deployable structure comprising:

a pole that is deployable along a longitudinal deployment axis, and that is designed to be able to be placed either in a folded state in which it has a minimum axial space requirement or in a deployed state in which it has a predetermined shape, a base on which said deployable pole stands, said foldable/deployable structure also having a bracing device, said bracing device:

having at least three points for fixing to said base and at least three points for fixing to said pole, said bracing device connecting said base to said pole;

being designed to be able to limit the transverse movements of the pole with respect to the base, at least in said deployed state of said pole; and comprising at least one connecting member chosen from a group made up of woven fabrics, nonwovens and ties, said ties being chosen from another group made up of monofilaments, cables, bundles and tapes;

wherein said foldable/deployable structure further comprises a device for tensioning each connecting member of said bracing device, designed to be able to tension each connecting member of said bracing device, in the deployed state of the pole: and wherein the device for tensioning said bracing device has a helical spring designed to be able to be compressed in the folded state of said pole and extended in the deployed state of said pole so as to keep a proximal end of said pole at a distance from said base greater than the distance separating the pole from said base when the pole is in the folded state.

2. The foldable/deployable structure as claimed in claim 1, wherein said structure comprises another device for controlling the initiation of the deployment associated with said pole so as to be able to allow the longitudinal deployment thereof into the deployed state from the folded state.

3. The foldable/deployable structure as claimed in claim 1, wherein said bracing device comprises at least two ties, at least one of said ties being a tape having at least two points for fixing to said base and at least two points for fixing to said pole.

4. The foldable/deployable structure as claimed in claim 1, wherein said bracing device comprises at least three ties, each tie having at least one point for fixing to said base and at least one point for fixing to said pole.

5. The foldable/deployable structure as claimed in claim 1, wherein each connecting member connects said base to a distal end of said pole in the deployed state.

6. The foldable/deployable structure as claimed in claim 1, wherein the base comprises at least three flaps designed to be able to pivot between at least one closed position, in which said flaps form a receptable that is able to at least partially receive said pole in the folded state, and at least one open position, in which the flaps have been pivoted away from said pole, each connecting member connecting at least one point of a flap to at least one point of said pole.

7. The foldable/deployable structure as claimed in claim 1, wherein when said foldable/deployable structure is locked in the deployed state, said bracing device is designed to be able to keep said pole isostatic with respect to said base.

8. The foldable/deployable structure as claimed in claim 1, wherein, in the deployed position, each connecting member extends in at least one direction forming a non-zero angle with respect to the longitudinal deployment axis of said pole.

9. The foldable/deployable structure as claimed in claim 1, wherein said structure further comprises an antenna.

10. The foldable/deployable structure as claimed in claim 9, wherein, in the deployed state, said antenna is helical and extends in a longitudinal direction substantially parallel to said longitudinal deployment axis, said pole extending longitudinally inside said antenna.

11. The foldable/deployable structure as claimed in claim 9, wherein said bracing device has at least one point for fixing to said antenna.

12. The foldable/deployable structure as claimed in claim 1, wherein said pole adopts, in the deployed state, a rigid stable form under axial compression.

* * * * *